United States Patent
Oztaskent et al.

(10) Patent No.: US 9,401,947 B1
(45) Date of Patent: Jul. 26, 2016

(54) METHODS, SYSTEMS, AND MEDIA FOR PRESENTING COMMENTS BASED ON CORRELATION WITH CONTENT

(71) Applicant: Google Inc., Mountain View, CA (US)

(72) Inventors: Ant Oztaskent, Sutton (GB); Yaroslav Volovich, Cambridge (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/762,535

(22) Filed: Feb. 8, 2013

(51) Int. Cl.
*G06F 7/00* (2006.01)
*G06F 17/30* (2006.01)
*H04L 29/08* (2006.01)

(52) U.S. Cl.
CPC ............ *H04L 67/02* (2013.01); *G06F 17/3053* (2013.01)

(58) Field of Classification Search
CPC .............. H04L 67/02; G06F 17/30634; G06F 17/30861
See application file for complete search history.

(56) References Cited

U.S. PATENT DOCUMENTS

| | | | |
|---|---|---|---|
| 7,257,774 B2 * | 8/2007 | Denoue et al. | 715/719 |
| 7,669,123 B2 | 2/2010 | Zuckerberg et al. | |
| 8,204,897 B1 | 6/2012 | Djabarov et al. | |
| 8,396,879 B1 * | 3/2013 | Cierniak et al. | 707/750 |
| 9,176,949 B2 * | 11/2015 | Bullock | G06F 17/2785 |
| 2003/0061214 A1 * | 3/2003 | Alpha | 707/7 |
| 2007/0033228 A1 | 2/2007 | Fassett et al. | |
| 2007/0038567 A1 | 2/2007 | Allaire et al. | |
| 2007/0078671 A1 * | 4/2007 | Dave et al. | 705/1 |
| 2007/0186754 A1 * | 8/2007 | Cho | G10H 1/0008 84/610 |
| 2008/0027921 A1 * | 1/2008 | Chandrasekar et al. | 707/4 |
| 2009/0106235 A1 * | 4/2009 | Tankovich et al. | 707/5 |
| 2009/0119598 A1 * | 5/2009 | Oztaskent | 715/733 |
| 2010/0162093 A1 * | 6/2010 | Cierniak | 715/205 |
| 2010/0169327 A1 * | 7/2010 | Lindsay et al. | 707/750 |
| 2010/0306708 A1 | 12/2010 | Trenz et al. | |
| 2011/0029512 A1 | 2/2011 | Folgner et al. | |
| 2011/0043652 A1 | 2/2011 | King et al. | |
| 2011/0167077 A1 | 7/2011 | Govani et al. | |
| 2011/0289098 A1 * | 11/2011 | Oztaskent et al. | 707/769 |
| 2011/0307464 A1 | 12/2011 | Ghosh | |
| 2012/0036085 A1 * | 2/2012 | Srivastava et al. | 705/348 |
| 2012/0330968 A1 * | 12/2012 | Lee et al. | 707/748 |
| 2013/0004141 A1 | 1/2013 | Wu et al. | |
| 2013/0080427 A1 * | 3/2013 | Cross et al. | 707/728 |
| 2014/0201180 A1 * | 7/2014 | Fatourechi et al. | 707/706 |

OTHER PUBLICATIONS

Amazon.com, http://web.archive.org/web/20121229210452/http://www.amazon.com/Pure-Fun-9005MTH-Trampoline-Handrail/dp/B002N5AHFS, Dec. 29, 2012.*

(Continued)

*Primary Examiner* — Aleksandr Kerzhner
*Assistant Examiner* — Karina Levitian
(74) *Attorney, Agent, or Firm* — Byrne Poh LLP

(57) ABSTRACT

Methods, systems, and media for presenting comments based on correlation with content are provided. In some implementations, a method for presenting ranked comments is provided, the method comprising: receiving, using a hardware processor, content data related to an item of content; receiving, using the hardware processor, comment data related to a comment associated with the item of content; determining, using the hardware processor, a degree of correlation between at least a portion of the comment data and one or more portions of the content data; determining, using the hardware processor, a priority for the comment based on the degree of correlation; and presenting, using the hardware processor, the comment based on the priority.

26 Claims, 7 Drawing Sheets

(56) References Cited

OTHER PUBLICATIONS

Madden, et a.. "A classification scheme for content analyses of YouTube video comments." Journal of documentation 69.5 (2013): 693-714.*

Correia et al., "Active Video Watching Using Annotation," ACM Multimedia '99 (1999).*

International Search Report dated Oct. 18, 2013 in International Patent Application No. PCT/US2013/049918.

Office Action dated Dec. 19, 2013 in U.S. Appl. No. 13/601,722.

Office Action dated Oct. 9, 2014 in U.S. Appl. No. 13/601,722.

* cited by examiner

METHODS, SYSTEMS, AND MEDIA FOR PRESENTING COMMENTS BASED ON CORRELATION WITH CONTENT

TECHNICAL FIELD

The disclosed subject matter relates to methods, systems, and media for presenting comments based on correlation with content.

BACKGROUND

Generally speaking, many distribution channels through which content (e.g., videos, news articles, blog posts, etc.) is presented to users allow for users to post and view comments. For example, many web pages involved in distributing content items allow users to post and view comments in association with those content items. As another example, applications (e.g., smartphone applications, smart television applications, digital media receiver applications, and the like) involved in distributing content items allow users to post and view comments in association with those content items. In some cases, comments can be shared across channels such that, for example, comments posted on a web page can be viewed on an application associated with the web page.

Techniques for separating high-quality, interesting, or relevant comments from low quality, irrelevant, or spam comments associated with an item of content often rely on actions by users and/or relationships between users. For example, comments can be rated as high quality or low quality based on the opinions of users, based on whether the comments that receive more or fewer responses, etc. As another example, comments can be rated as high quality or low quality based on the comments coming or not coming from trusted users, frequent users, user's connected to a user viewing the comments through a social network, etc. However, these techniques are problematic in that they require actions by users and/or relationships between users and are not able to deal with comments when the comments are initially posted. Accordingly, it is desirable to provide methods, systems, and media for presenting comments based on correlation with content.

SUMMARY

In accordance with various implementations of the disclosed subject matter methods, systems, and media for presenting comments based on correlation with content are provided.

In accordance with some implementations of the disclosed subject matter, methods for presenting ranked comments are provided, the methods comprising: receiving, using a hardware processor, content data related to an item of content; receiving, using the hardware processor, comment data related to a comment associated with the item of content; determining, using the hardware processor, a degree of correlation between at least a portion of the comment data and one or more portions of the content data; determining, using the hardware processor, a priority for the comment based on the degree of correlation; and presenting, using the hardware processor, the comment based on the priority.

In some implementations, the method further comprises generating, using the hardware processor, a score based on the degree of correlation and associating the score with the comment.

In some implementations, determining a priority further comprises comparing, using the hardware processor, the score for the comment with a score for one or more other comments associated with the item of content.

In some implementations, the content item comprises at least one of the following: text, video, and an image.

In some implementations, the method further comprises identifying, using the hardware processor, a relevant portion of comment data based on the determined degree of correlation between the at least a portion of comment data and a portion of the content data being greater than a threshold degree of correlation.

In some implementations, the method further comprises: determining, using the hardware processor, a degree of correlation between the relevant portion of comment data and a relevant portion of comment data for a second comment; and generating, using the hardware processor, an aggregate comment by associating the comment and the second comment upon determining that the degree of correlation between the relevant portions is over a second threshold degree of correlation.

In some implementations, the method further comprises generating, using the hardware processor, an aggregate score based on the scores of the comment and the second comment in response to aggregating the comment and second comment, and wherein presenting the comment based on priority further comprises presenting the comment based on the aggregate score for the aggregated comment.

In some implementations, the method further comprises providing a link from the comment to a portion of the content that has a degree of correlation over a threshold to the relevant portion of comment data.

In accordance with some implementations of the disclosed subject matter, a systems for presenting ranked comments are provided, the systems comprising: a hardware processor configured to: receive content data related to an item of content; receive comment data related to a comment associated with the item of content; determine a degree of correlation between at least a portion of the comment data and one or more portions of the content data; determine a priority for the comment based on the degree of correlation; and present the comment based on the priority.

In accordance with some implementations of the disclosed subject matter, non-transitory computer readable media containing computer executable instructions that, when executed by a processor, cause the processor to perform methods for presenting ranked comments are provided. The methods comprising: receiving content data related to an item of content; receiving comment data related to a comment associated with the item of content; determining a degree of correlation between at least a portion of the comment data and one or more portions of the content data; determining a priority for the comment based on the degree of correlation; and presenting the comment based on the priority.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
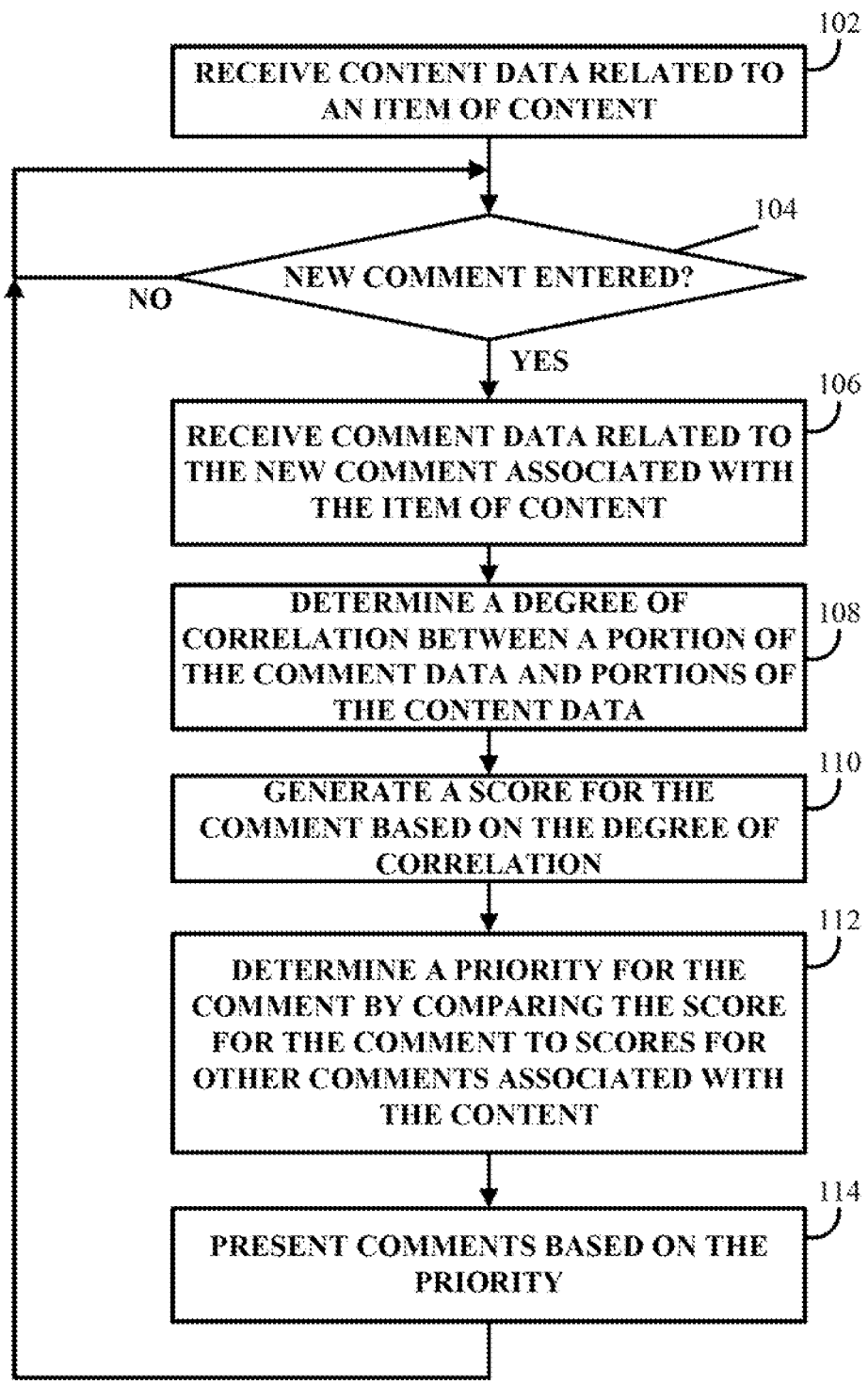
FIG. 1 shows an example of a process for presenting comments based on correlation with content in accordance with some implementations of the disclosed subject matter.

In accordance with various implementations, mechanisms for presenting comments based on correlation with content are provided.

In some implementations, when a new comment is received in association with a content item, it can be determined if any portion of the comment is correlated with any portion of the content item. Comments can be received for any suitable type of content and can take any suitable form. For example, in some implementations, content can include text, video, images, animation, sound, etc., or any suitable combination thereof. Similarly, comments can include text, video, images, animation, sound, etc., or any suitable combination thereof in some implementations.

For example, if the content item includes text, text from a comment can be compared with text from the content item to determine if there is any correlation between the text of the comment and the text of the content item. A correlation can exist, for instance, if the comment includes a quotation or a paraphrase of a quotation from the text.

As another example, if the content item includes video, text from the comment can be compare with transcript or closed captioning data for the video to determine if there is a correlation between the text of the content item and dialogue or other words (whether spoken or written) in the video (e.g., via the comparison with transcript or captioning data).

As yet another example, if the content item includes images or video, text from the comment can be compared to optical character recognition (OCR) data generated from the images or video to determine if there is a correlation between the text of the content item and text within the image or video.

It should be noted that although comments are described as containing text, comments can contain any type of content, such as video, or image content, which can be analyzed to extract text data using techniques similar to techniques used for analyzing content items to extract text data.

In some implementations, a degree of correlation can be determined between portions of the comment and portions of the content item based on a comparison between comment data and the content item. For example, the degree of correlation can represent how similar (or dissimilar) a portion of the comment is from one or more portions of the content. For instance, if a commenter quotes a content item, but misspells a word, the quote from the comment can be considered closely correlated with the quoted portion of the content item. On the other hand, if a comment has one word (or a few words) in common with a portion of the content item, the portion containing common word is not likely to be closely correlated, except in some instances where the word in common is a word that is unique to the content or otherwise rarely used.

In some implementations, a score can be generated for a comment based on the degree of correlation between a portion of the comment and a portion of the content item. For example, a comment that contains a portion that directly quotes a content item can be scored more highly than a comment that does not contain a quotation from the content item. Other factors can also be used in generating the score. For example, a more recent comment can be scored more highly than a less recent comment. As another example, a comment that one or more users have selected as being a comment that is to that user's liking can be given a higher score. As yet another example, a comment that one or more user's has denoted as "spam" can be given a lower score.

In some implementations, a priority can be determined for a comment based on a score for the comment and scores for other comments. For example, comments can be ranked from highest score to lowest score, and comments can receive a priority based on the position in the ranking.

In some implementations, comments can be presented to a user for viewing based on the priority assigned to the comments. For example, a comments section can be presented to a user in which the comments are sorted based on score such that a comment with a highest score is presented first. As another example, a comments section can be split into multiple portions where one portion can be used to present a certain number of comments (e.g., two comments, three comments, etc.) based on priority, and another section can be used to present other comments based on another factor, such as the recency of the comment.

In some implementations, each time a new comment is posted, all comments can be reprioritized based on the inclusion of the new comment. For example, when a new comment is posted, a degree of correlation between the new comment and the associated content item can be determined and a score can be generated for the comment. The score for the new comment can be compared to scores for other comments and all of the comments (or some portion of the comments, e.g., only comments with a degree of correlation or score over a threshold) can be ranked against one another and reprioritized.

In some implementations, if a portion of a comment is correlated with a portion of the content item, a mechanism can be provided to navigate from the comment to the relevant portion of the content item. For example, if a comment contains a quotation from an article, a link can be provided that will cause the portion of the article that is quoted to be presented to the user. As another example, if a comment contains a paraphrased expression from a video, a user interface can provide a mechanism for navigating to the moment in the video containing the referenced expression.

The mechanisms described herein can be used in various applications. For example, relevant or interesting comments can be presented to users as top comments without relying solely on user generated feedback, such as social signals, recommendations, voting by other users, or the like. As another example, popular portions of a content item (e.g., a portion that is referenced in one or more user comments) can be identified through links between comments and relevant portions of the content item.

Turning to FIG. 1, an example 100 of a process for presenting comments based on correlation with content is illustrated in accordance with some implementations of the disclosed subject matter. In some implementations, process 100 can begin by receiving content data related to an item of content.

The item of content can include any suitable content. For example, in some implementations, the item of content can include video data, text data, image data, etc. The content data related to the item of content can include any suitable data related to the content. For example, in some implementations, the content data can include text data and/or speech data associated with the content item. For example, in some implementations, if the content item includes video data, the content data can include captioning data and/or transcript data. In such an example, the content data can also include data extracted from the video data using, for example, optical character recognition (OCR) techniques, in some implementations. The content data can further include data extracted from metadata associated with the video data.

As another example, if the content item includes image data, the content data can include data extracted from the image data using, for example, OCR techniques, in some implementations. The content data can further include data extracted from metadata associated with the image data. As yet another example, if the content item includes text data the content data can include the text included in the text data.

At 104, it can be determined whether a new comment has been entered that relates to the item of content received at 102. In some implementations, each time a comment is posted, it can be considered entered at 104 as a new comment. Additionally, if comments can be edited by a user that posted the comment, a newly edited comment can be considered entered as a new comment.

If a new comment is not entered ("NO" at 104), process 100 can stay at 104 and continue to determine whether a new comment is entered. Otherwise, if a new comment is entered ("YES" at 104), process 100 can move to 106.

At 106, comment data related to the new comment can be received. In some implementations, the comment can include any suitable data including video data, text data, image data, etc. Similarly to the content data, the comment data can include any suitable data related to the comment, such as, text data and/or speech data.

At 108, a degree of correlation between a portion of the comment data and one or more portions of the content data can be determined. Any suitable techniques can be used to determine a degree of correlation. For example, in some implementations, string matching techniques and/or substring matching techniques can be used to determine whether any portion of the comment data matches any portion of the content data. In finding correlations, some allowance can be made for differences between the content data and the comment data. For example, comment data with spelling that does not match the content data (e.g., comment data with misspellings or content data with misspellings, different spellings due to regional language differences (such as American English spellings versus British English spellings), abbreviations, substitution of symbols for words and vice versa (e.g., substituting "%" for percent, and so on), etc.) can be considered a match regardless of the spelling differences. In such an example, a degree of correlation can be reduced based on any differences in spelling. As another example, portions with insertion, deletion, replacement, and/or transposition of a word(s) can be considered matches with a corresponding reduction in a degree of correlation between the two words. Any other suitable differences between the content data and the comment data can be taken into account by a corresponding reduction in the degree of correlation between the comment data and the content data.

In some implementations, a portion of the comment data can be used as a query to search the content data using any suitable search techniques. In such an example, any portion of the comment data (up to and including all of the comment data) can be used in generating a query for searching the content data.

In some implementations, the comment data can be compared to similarly sized portions of the content data to determine a degree of correlation. For example, if the content is video data and the content data is text that corresponds to captioning data, a comment can be compared to portions of the caption text to determine a correlation between the comment and the caption text. For instance, a string of characters representing the comment data can be compared to equal sized (or similarly sized) strings in the content data. In this example, the comment string can be compared to a first string of characters starting at a first character in a string that makes up the whole of the content data. The comment string can then be compared to a second string of the same size as the first string but starting at the second character. This can be repeated for each string in the content of the same size, until all strings in the content have been compared to the comment string. It should be noted that these comparisons can be performed serially, in parallel, or any suitable combination thereof. For example, a batch of several strings can be compared in parallel, and then a next batch of strings can be compared in parallel, and so on.

Comparison between two strings can be performed using any suitable techniques. In some implementations, for example, a direct comparison between the two strings can be performed to determine if the comment (or portion of a comment) is a direct quotation from the content data. As another example, a distance metric can be found between the two strings to determine a degree of correlation. Any suitable technique can be used for determining a distance metric between two strings. For example, in some implementations, a Hamming distance can be found between two strings of equal length to determine a number of positions at which corresponding characters in a string are different. As another example, a Levenshtein distance can be found between two strings (which may be of equal or unequal length) to determine a number of single character insertions, deletions, or substitutions required to transform a first string into a second string. As yet another example, a Danerau-Levenshtein distance can be found between two strings (which may be of equal or unequal length) to determine a number of single character insertions, deletions, or substitutions, or transposition of two adjacent characters, required to transform a first string into a second string.

In some implementations, portions of comment data that are more likely to correspond to portions of content data can be identified, and these portions can then be compared to the content data to determine a degree of correlation. For example, content data and comment data can be separated into smaller portions (e.g., data that includes a plurality of words can be separated to extract each word). Any suitable techniques can be used to perform separation of the comment data. For example, text data can be parsed into a set of tokens that can be used for matching comment data and content data.

In some implementations, content data can be indexed when the content is published (e.g., when the content is made available) to make comparison with comment data more efficient. For example, content data can be separated into words and the frequency of appearance of these words in the content and/or the location of appearance of the words can be stored in an indexed data structure. The comment data can be put through the same process of separation, and each word in the comment data can be compared to the indexed words of the content data. Each match between a word in the comment data and a word in the index can be recorded along with the location at which the words in the index are located in the content data. When all words in the comment data are compared to the index, it can be determined whether there are any grouping of words that appear in both the comment data and the content data. For example, portions where two or more words that match between the comment data and the content data and that are located near each other in both the content data and the comment data can be determined to be relevant portions of the content data and the comment data.

Figure 2:
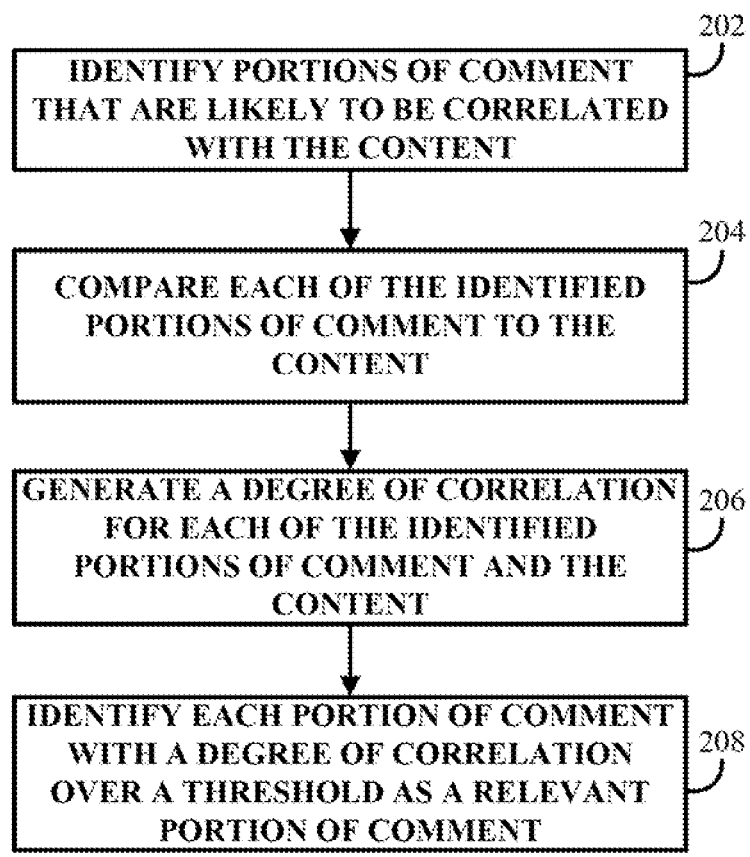
FIG. 2 shows an example of a process for identifying relevant portions of comments in accordance with some implementations of the disclosed subject matter.

FIG. 2 shows an example 200 of a process for determining a degree of correlation between a portion of the comment data and one or more portions of the content data in accordance with some implementations. For example, in some implementations, process 200 can be used to determine a degree of correlation between a portion of a comment and one or more portions of content at 108. At 202, a portion (or portions) of comment data that are likely to be correlated with the content can be identified. Any suitable techniques can be used to determine which portions of comment data (if any) is likely to be correlated with the content data. For example, techniques described above in connection with FIG. 1, such as string matching techniques, substring matching techniques, etc.

In some implementations, identified portions of comment data can overlap with each other within the comment data. Alternatively, two or more portions of comment data that overlap with another portion of comment data by more than a threshold amount can be inhibited from being identified as an identified portion of comment data.

At 204, each of the portions of the comment data identified at 202 can be compared to the content data that the comment is associated with. Any suitable techniques can be used to compare the identified comment portions with the content. For example, a distance metric between an identified portion of comment data and a portion of content data can be determined. In some implementations, each identified portion of comment data can be compared to all similarly sized portions in the content data.

Additionally or alternatively, each identified portion can be compared with portions of the content data that were determined as likely matches to the comment data. For instance, if a portion of comment data was determined as a likely match with three portions of the content data, that portion of comment data can be compared to each of the three portions using any suitable techniques, as described herein.

Additionally or alternatively, each identified portion of comment data can be compared to data surrounding a portion of content data associated with the comment data as being likely to match the portion of comment data. For example, the identified portion of comment data can be compared to a portion of data before and/or after the associated portion of content. For instance, content data within a specified margin around an associated portion of content data can be compared with the identified comment data to determine a degree of correlation.

In some implementations, a comparison between a particular identified portion of comment data and a particular portion of content data that results in a closest match can be used to generate a degree of correlation between the identified portion of comment data and the content data at 206.

Alternatively, each portion of content data that matches the identified comment data over a threshold amount can be used to generate a degree of correlation between the identified portion of comment data and the content data at 206. For example, if a portion of content data is an eighty percent match (or fifty percent, seventy five percent, etc.), that portion of content data can be used to determine a degree of correlation. As another example, if a Levenshtein distance between the identified comment portion and a particular content portion is below a specified threshold, which can be based on a length of the identified comment portion, the content portion can be used in determining a degree of correlation.

At 206, a degree of correlation can be generated for each of the identified portions of comment data. In some implementations, the degree of correlation can represent how closely a portion from the comment data matches a portion in the content data. For example, a result of a distance metric determination can be used to generate a degree of correlation. If multiple portions of content data are used to generate the degree of correlation, an average (or a weighted average) can be taken of a degree of correlation for each of the portions of content data.

In some implementations, the degree of correlation can be normalized based on any suitable factor(s). For example, if a distance determination between the identified portion of comment data and a portion of content data is used to generate a degree of correlation, the degree of correlation can be normalized based on a length of the comment portion (e.g., a number of characters in the portion of comment data), a maximum possible distance given the length of the comment portion (e.g., a theoretical maximum number of operations given a number of characters in the portion of comment data), etc.

At 208, portions of comment data with a degree of correlation over a threshold can be identified as a relevant comment portion. For example, the degree of correlation can be representative of a confidence that a particular comment portion corresponds to a portion of the content. For instance, the degree of correlation can represent a determination of a likelihood that a comment on a video contains a quotation from the video, or that a comment on a news article contains a quotation from the news article. It should be noted that a portion of comment data can be correlated with more than one portion of content data. It should also be noted that more than one portion of comment data can be correlated with one or more portions of content data.

Returning to FIG. 1, at 110, a score can be generated for the new comment based on the degree of correlation determined at 108. Any suitable technique(s) can be used to generate a score at 100. For example, in some implementations, the score can be determined based exclusively on the degree (or degrees) of correlation determined at 108. Alternatively, in some implementations, a degree of correlation determined at 108 can be used in combination with other factors to determine a score for a comment. For example comments having certain properties can be given a higher score. These score boosting properties can include: the recency of a comment; a length of a portion of comment data that is correlated with content data; the presence of a link to another content item; a level of a favorable rating by other users; a level of a favorable rating by users in a social network of a user accessing the content item; a number of responses from unique users; a number of times the comment has been shared; etc. In some implementations, comments having certain properties can be given a lower score. These score lowering properties can include: the presence of a link to a destination known to be associated with malware; a level of a negative rating by other users; a likelihood that the comment contains irrelevant information (e.g., a likelihood that the comment is "spam"); etc.

Figure 3:
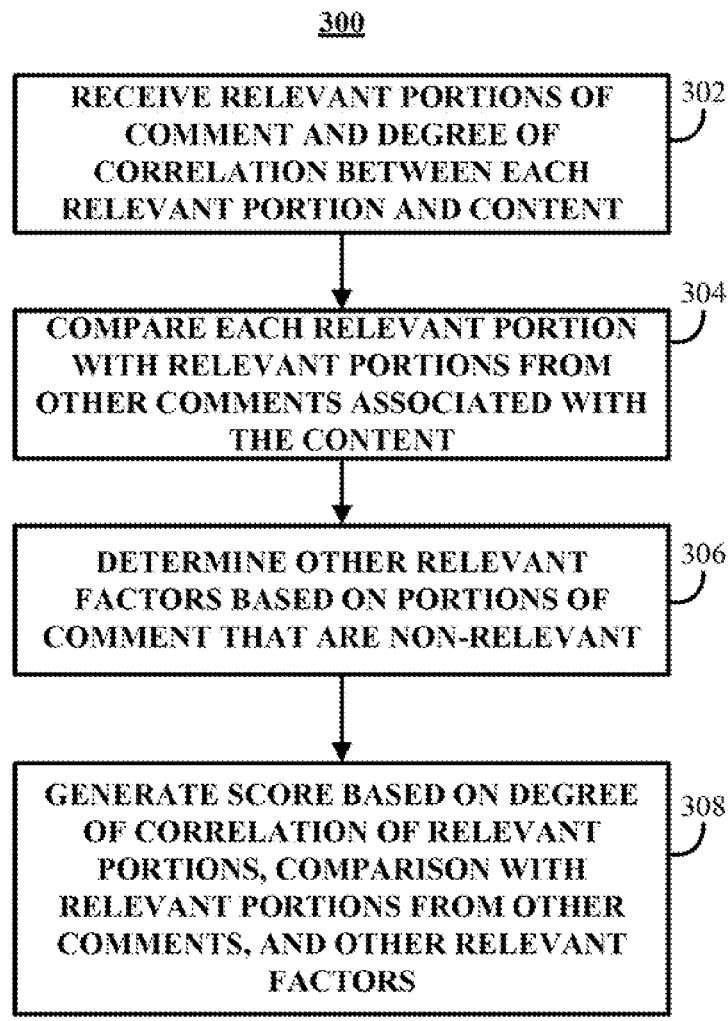
FIG. 3 shows an example of a process for generating a score for a comment in accordance with some implementations of the disclosed subject matter.

FIG. 3 shows an example 300 of a process for generating a score for a comment based on a degree of correlation determined at 108 in accordance with some implementations. Process 300 can begin by receiving relevant portions of comment data and a degree of correlation associated with each of the relevant portions of comment data at 302. At 302, a portion of the content data with which the received relevant portion is associated can also be received. For example, each portion of a comment that has been determined to be a relevant portion of a comment can be associated with that portion of the content item with which it is correlated.

At 304, each relevant portion received at 302 can be compared with relevant portions from other comments to determine whether the received comment portion and the other relevant comment portions are correlated with the same portion of the content. For example, a first comment that has been determined to contain a relevant portion (e.g., the first comment quotes a portion of the content) can be compared to relevant portions of other comments to determine if those other comments are correlated with the same portion (e.g., to determine if the other comments quoted the same portion of the content as the first comment). As another example, a first relevant portion from first comment data can be compared to relevant portions from other comment data using any suitable technique. For example, relevant portions of comments can be compared using techniques described in connection with FIG. 2, such as determining a distance between the relevant portions.

In some implementations, if it is determined that one or more relevant portions of other comments are similar to a relevant portion received at 302, or that other relevant portions refer to the same portion of content, then the comments can be associated with each other.

At 306, other relevant factors used to generate a score can be determined. For example, factors described above in connection with FIG. 1 can be determined, such as recency, length of correlated portion, rating, etc.

At 308, a score can be generated based on a degree of correlation of each of the relevant portions, the comparison with relevant portions from other comments, and other relevant factors. For example, a comment that contains a relevant portion that is similar to relevant portions in other comments, and/or refers to the same portion (or substantially the same portion) of the content as relevant portions in other comments can be given a higher score. For instance, each other comment that contains a similar relevant portion can increase the score generated for a comment by a predetermined amount or act as a multiplier for increasing the score generated for the comment.

As described above, a score can also be increased or decreased based on other relevant factors.

Returning to FIG. 1, at 112, a priority can be determined for the comment received at 104 based on a comparison of the score for the comment and the score for other comments associated with the content. For example, the score for the comment can be ranked against scores for each other comment associated with the item of content received at 102. In such an example, a priority can be assigned to the comment based on the position of the comment within the ranking.

At 114, comments can be presented based on the priority determined at 112. Any suitable techniques can be used to present comments based on the priority of the comments. For example, all comments associated with the item of content can be presented based on the priority. In such an example, a top scoring comment can be presented first, and other comments can be presented based on the relative score of the comments.

In another example, a predefined number of comments that have high priority can be presented, and other comments that are not among the predefined number can be presented based on some other criteria. For instance, in such an example, three comments (or any suitable number of comments) with the highest priority can be presented as top comments in a top comments section and other comments can be presented in another section. These other comments can be presented by recency (e.g., the newest comments can be presented at the top of the comments section, or the oldest comments can be presented at the top of the comments section), by another type of ranking, such as, by number of responses, by number of times recommended or selected by users, etc.

In another example, comments that reference the same portion of content (e.g., comments that include relevant portions that are correlated with the same portion of content data) can be aggregated and presented together based in part on the number of comments that reference the same portion of content.

In some implementations, a user can choose the manner in which comments are presented and/or sorted. For example, a user can choose to be shown top comments, or can choose to have display of top comments inhibited.

Figure 4:
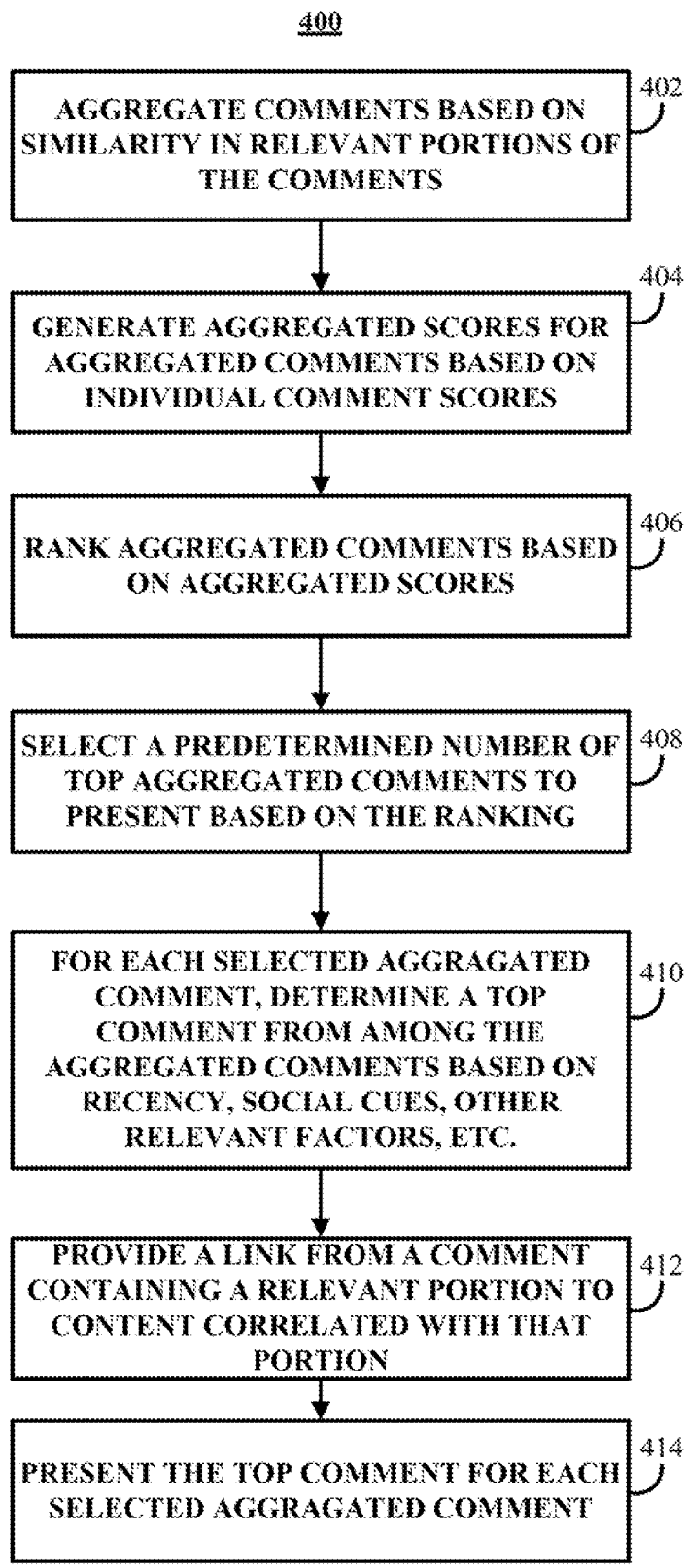
FIG. 4 shows an example of a process for presenting top comments based on comment scores in accordance with some implementations of the disclosed subject matter.

Turning to FIG. 4, an example 400 of a process for presenting comments based on the priority determined at 112 is shown in accordance with some implementations. At 402, various comments associated with the item of content can be aggregated based on similarity of relevant portions of the content. Similarity of relevant portions can be determined using any suitable techniques. For example, in some implementations, similarity can be determined using the techniques described in connection with FIG. 3, such as comparing portions of the comments identified as relevant portions to determine if they are similar.

At 404, an aggregate score can be generated for the each of the aggregated comments from 402 based on the individual comment scores of the comments that make up the aggregated comments. For example, the individual scores can be added, averaged, a weighted average can be calculated, etc.

At 406, aggregated comments can be ranked against each other based on the aggregated score. For example, the aggregated scores can be compared, and the aggregated comments can be put in order of aggregated score from highest to lowest. It should be noted that aggregated comments can include a single comment that contains a relevant portion, and need not include more than one comment.

At 408, a predetermined number of top aggregated comments can be selected based on the ranking performed at 406. For example, the top two (or one, three, etc.) aggregated comments can be selected to present as top comments.

At 410, a top comment to present from among the aggregated comments can be determined for each selected top aggregated comment. A top comment from among the top aggregated comments can be determined in any suitable manner. For example, in some implementations, the individual scores generated at 110 for each of the comments that make up the aggregated comment can be used to rank the comments. As another example, other factors such as recency, social cues, etc. can be used to determine a top comment from among the comments that make up an aggregated comment.

As yet another example, a top comment from among the aggregated comments can be chosen arbitrarily, for example, based on a function that takes a time when the comments are loaded as an input.

At 412, links can be provided from relevant portions of the comment to the content that is correlated with that relevant portion. For example, a portion of a comment that is correlated with the content (e.g., a portion of the comment that quotes the content, that closely paraphrases the content, etc.) can be selected by a user to navigate to the portion of the content that is correlated with that portion of the comment.

In some implementations, a portion of the comment that contains a link to the content can be differentiated from portions of the content that were determined to not be correlated with the content. The portion containing the link can be differentiated from portions that do not contain a link using any suitable techniques. For example, a portion of a comment that contains a link can be differentiated by using one or more of the following techniques: highlighting; underlining; bolding; italicizing; being presented in a different color; being presented at a different size; being presented using a different font; etc.

In some implementations, selecting the link using a user interface can cause the user interface to navigate to the portion of the content correlated with the linked portion of the comment. For example, if the content item is a web page containing text loaded by a web browser (e.g., an article, a blog post, etc.), selecting the link can cause the browser to navigate to the portion of the web page containing the linked content. As another example, if the content item is a video that can be played on a first device and the comments are being displayed on a second device (e.g., a video application running on a display device with comments displayed on a second screen device, such as a tablet computer) selecting the link can cause the video to be played on the first device at (or around) the portion of the content item linked to from the comment.

At 414, the top comment corresponding to each aggregated comment can be presented as top comments on a user interface for presenting comments associated with the content item.

Returning to FIG. 1, after determining which comments to present at 114, process 100 can return to 104 to determine if a new comment was received.

Figure 5:
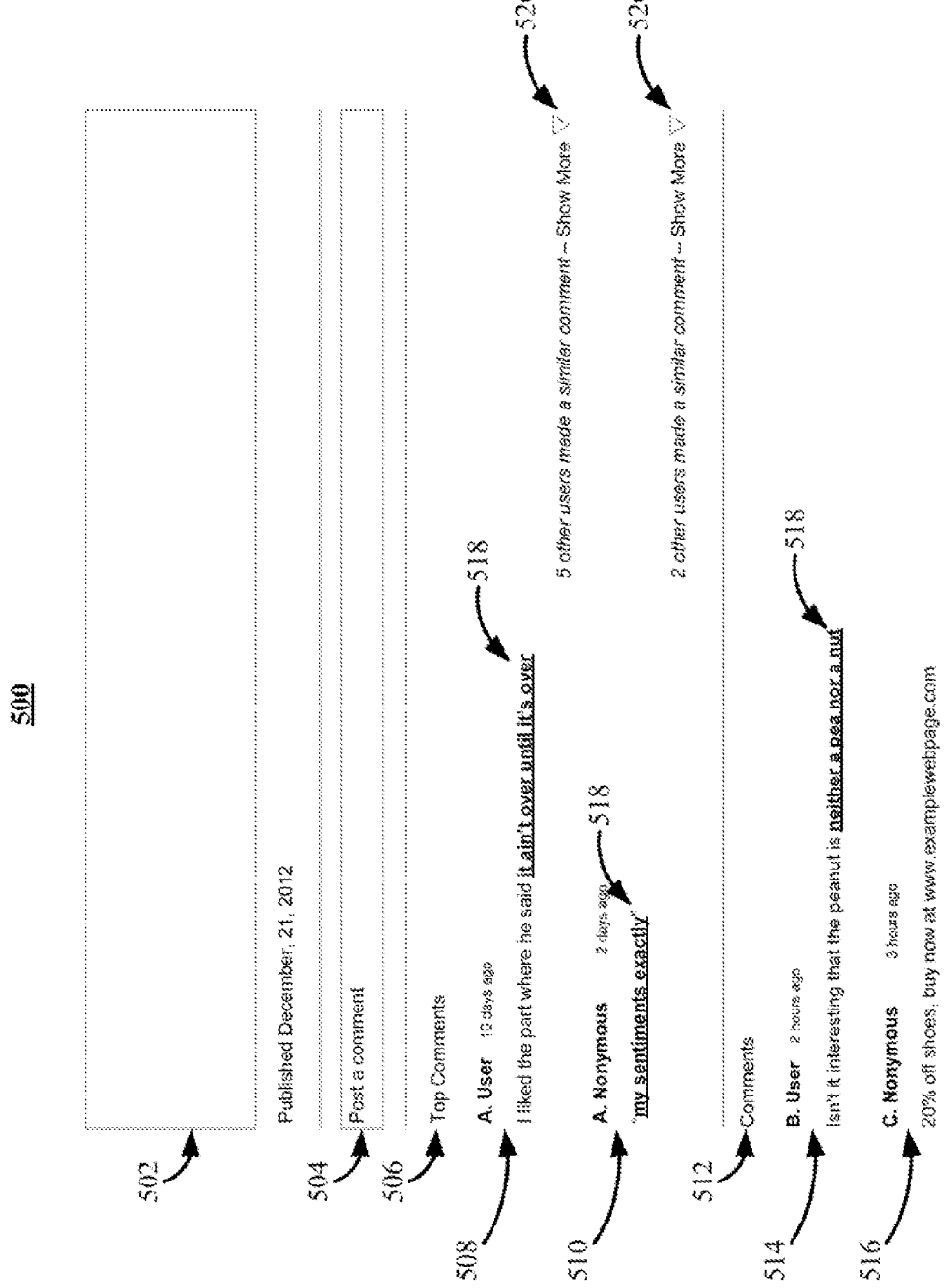
FIG. 5 shows an example of a user interface for presenting comments based on correlation with content in accordance with some implementations of the disclosed subject matter.

FIG. 5 shows an example, 500 of a user interface for presenting comments to a user. In some implementations, user interface 500 can include content item 502. As described above, content item 502 can include any suitable type of content, such as, text, images, video, or any suitable combination thereof.

In some implementations, user interface 500 can include a text box 504 that can be used to compose a comment to post in association with a content item, such as comment item 502. For example, a user can select text box 504 in order to compose a comment, which the user can then post in association with content item 502. In some implementations, a user interface item, such as a button, for posting a comment can be included in user interface 502 or can be presented to a user upon selection of text box 504 by the user.

It should be noted that, in some implementations, a user may be required to log-in, for example using a username and password, in order to be allowed to post a comment using user interface 500.

In some implementations, user interface 500 can include a top comments portion 506 that can include a selection of top comments based on a priority calculated using the mechanisms described herein. For example, top comments portion 506 can include comments 508 and 510 that have been identified as being top comments using the mechanisms described herein. It should be noted that, in some implementations, all comments can be presented based on priority, and thus, top comments portion 506 can take the place of both top comments portion 506 and a comments portion 512.

In some implementations, user interface 500 can include a comments portion 512 that can show comments based on factors other than priority. For example, comments portion 508 can include comments, such as, comments 514 and 516, presented based on how recently the comment was posted, or based on social cues such as user voting for comments.

In some implementations, portions 518 of a comment that are correlated with a portion of content item 502 can be differentiated from other portions of the comment. As described above in connection with FIG. 4, portions 518 can be differentiated by, for example, underlining, bolding, italicizing, coloring, etc. In the example shown in user interface 500, portions 518 are differentiated by bolding and underlining. In some implementations, a user can be inhibited from using the same style in a comment as is used to show that a portion of the comment is correlated with a portion of the content.

Additionally, in some implementations, a user can select portions 518 to navigate to the portion of the content that portion 518 is correlated with. For example, as described above in connection with FIG. 4, selecting portion 518 can take a user to a portion of the content (e.g., a position in a text, a time in a video, an image with a particular caption or text within it, etc.). It should be noted that portion 518 can be included in comments presented in top comments section 506 as well as in comments presented in comments section 512.

In some implementations, a user interface item for navigating to a linked portion of content can be included in user interface 500. For example, a button can be displayed in association with a comment that contains a portion relevant to content item 502. Selection of such a button can take the user to the relevant portion of the content.

It should be noted that, in some implementations, a relevant portion of the content can be left undifferentiated from the remainder of the comment, and an indication that the content is linked to some portion of the content can be presented, such as a button or other signal.

In some implementations, a comment that is aggregated with other comments that refer to the same portion of content (e.g., other comments that contain a relevant portion that is correlated with the same portion of content item 502) can be presented to a user using any suitable techniques. For example, in some implementations, as shown in FIG. 5, an indication that other similar comments exist and can be accessed can be presented to the user as a user interface item 520. In some implementations, a user can select an option, such as "show more" to cause other previously hidden comments to be displayed.

Figure 6:
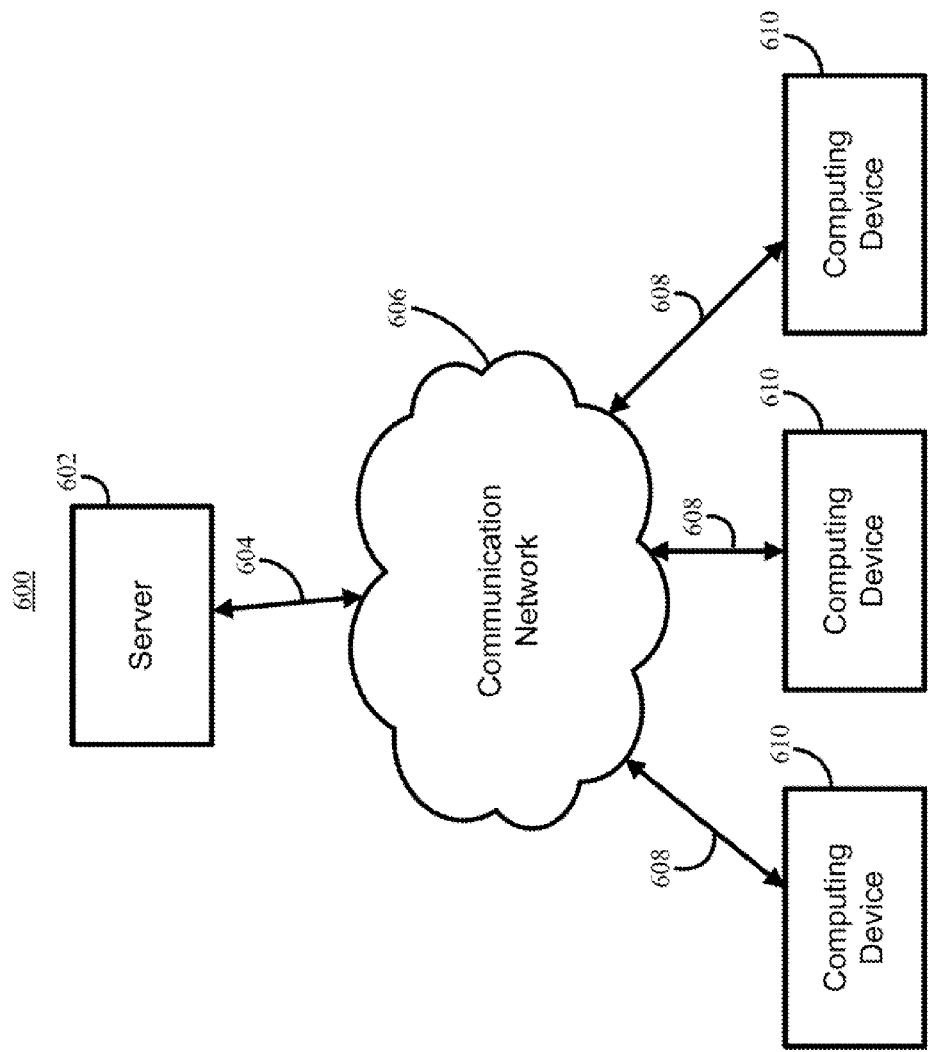
FIG. 6 shows a schematic diagram of an illustrative system suitable for implementation of the mechanisms described herein for presenting comments based on correlation in accordance with some implementations of the disclosed subject matter.

FIG. 6 shows an example 600 of a generalized schematic diagram of a system on which the mechanisms for presenting comments based on correlation with content as described herein can be implemented in accordance with some implementations. As illustrated, system 600 can include one or more computing devices 610. Computing devices 610 can be local to each other or remote from each other. Computing devices 610 and/or server 602 can be connected by one or more communications links 608 to a communications network 606 that can be linked via a communications link 604 to a server 602.

System 600 can include one or more servers 602. Server 602 can be any suitable server for providing access to the mechanisms described herein for presenting comments based on correlation with content, such as a processor, a computer, a data processing device, or any suitable combination of such devices. For example, the mechanisms for presenting comments based on correlation with content can be distributed into multiple backend components and multiple frontend components and/or interfaces. In a more particular example, backend components, such as data collection and data distribution can be performed on one or more servers 602.

In some implementations, each of the computing devices 610 and server 602 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 610 can be implemented as a personal computer, a laptop computer, a digital media receiver, a smartphone, a tablet computer, a personal data assistant (PDA), a set-top box, a smart television, a home entertainment system, a game console, any other suitable computing device, or any suitable combination thereof.

For example, in some implementations, a content item can be presented using a first computing device 610, such as a smart television, a set-top box, a digital media receiver, etc., and comments can be presented using a second computing device 610, such as a tablet computer, a smartphone, a PDA, etc.

Communications network 606 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 604 and 608 can be any communications links suitable for communicating data among computing devices 610 and server 602, such as network links, dial-up links, wireless links, hard-wired links, any other suitable communications links, or any suitable combination of such links. Computing devices 610 can enable use of the techniques described herein that can allow the features of the mechanisms to be used. Computing devices 610 and server 602 can be located at any suitable location.

Figure 7:
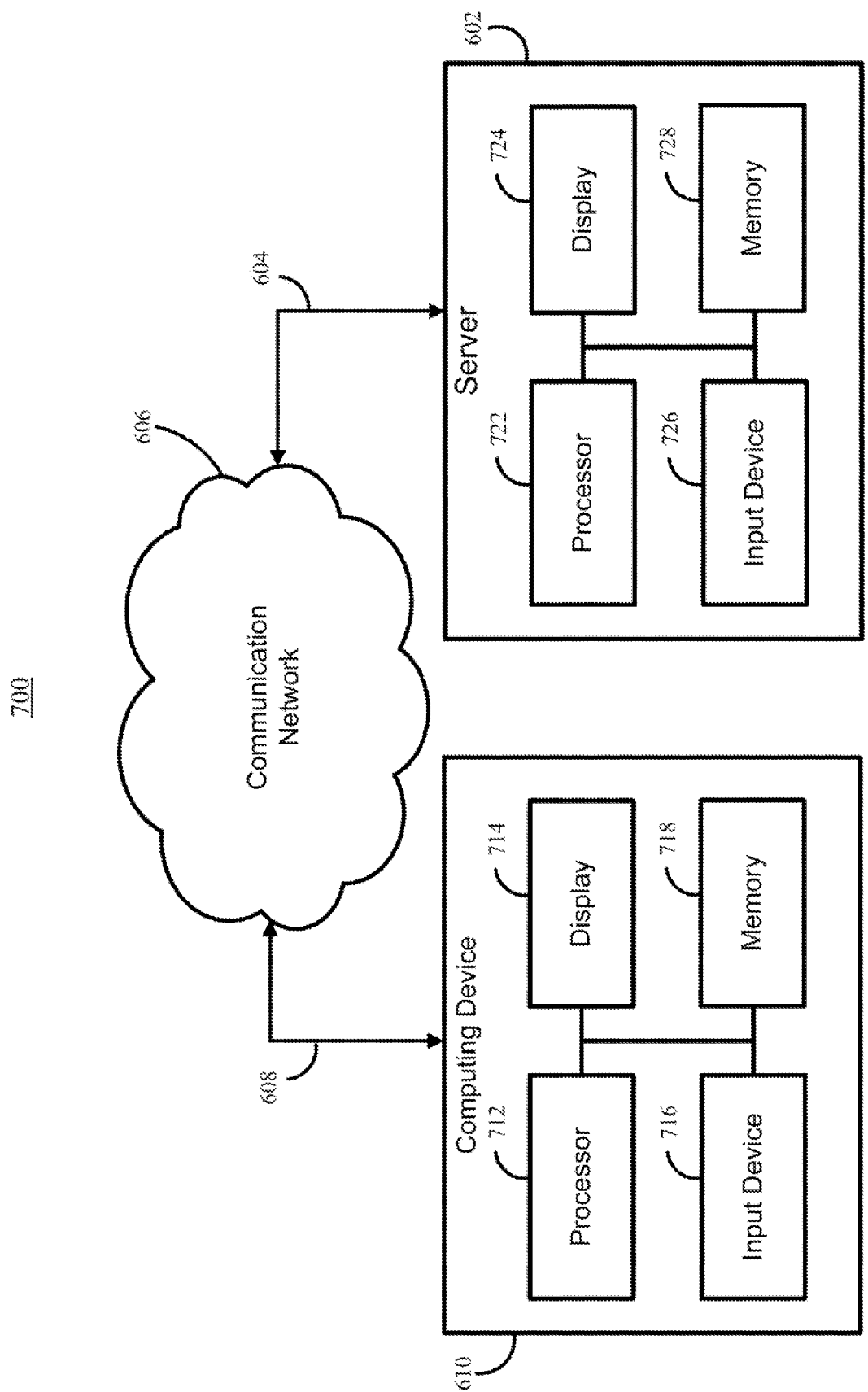
FIG. 7 shows a detailed example of a server and one of the computing devices of FIG. 6 that can be used in accordance with some implementations of the disclosed subject matter.

FIG. 7 illustrates an example 700 of hardware that can be used to implement server 602 and one of computing devices 610 depicted in FIG. 6 in accordance with some implementations. Referring to FIG. 7, computing device 610 can include a hardware processor 712, a display 714, an input device 716, and memory 718, which can be interconnected. In some implementations, memory 718 can include a storage device (such as a non-transitive computer-readable medium) for storing a computer program for controlling hardware processor 712.

Hardware processor 712 can use the computer program to present on display 714 content and/or an interface that allows a user to interact with the mechanisms described herein for presenting comments based on correlation with content and to send and receive data through communications link 608. It should also be noted that data received through communications link 608 or any other communications links can be received from any suitable source. In some implementations, hardware processor 712 can send and receive data through communications link 608 or any other communication links using, for example, a transmitter, receiver, transmitter/receiver, transceiver, or any other suitable communication device. Input device 716 can be a computer keyboard, a cursor-controller, dial, switchbank, lever, touchscreen, or any other suitable input device.

Server 602 can include a hardware processor 722, a display 724, an input device 726, and memory 728, which can be interconnected. In some implementations, memory 728 can include a storage device for storing data received through communications link 604 or through other links, and can also receive commands and values transmitted by one or more users. The storage device can further include a server program for controlling hardware processor 722.

The mechanisms described herein for determining a topic of conversation and/or for displaying content to a user can be implemented in computing devices 610 as software, firmware, hardware, or any suitable combination thereof.

In some implementations, server 602 can be implemented in one server or can be distributed as any suitable number of servers. For example, multiple servers 602 can be implemented in various locations to increase reliability and/or increase the speed at which the server can communicate with computing devices 610.

Accordingly, methods, systems, and media for presenting comments based on correlation with content are provided.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 to 4 can be executed or performed in any order or sequence not limited to the order and sequence shown and described in the figures. Also, some of the above steps of the processes of FIGS. 1 to 4 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting ranked comments based on a correlation between a portion of a video and comments associated with the video, the method comprising:

receiving, using one or more hardware processors, first text data of words in a video being presented to a first user in a first instance of a user interface;

receiving second text data that is part of a first user comment posted by the first user in association with the video, wherein the first user comment was posted using the first instance of the user interface;

identifying a first string of characters from the second text data that is likely to include a quote of the first text data, wherein the first string of characters includes a plurality of words;

in response to identifying the first string of characters, comparing the first string of characters to at least a second string of characters from the first text data;

determining how different the first string of characters is from the second string of characters based on the comparison;

determining a degree of correlation between the first string of characters and the first text data based at least in part on how different the second string of characters is from the first string of characters, wherein the degree of correlation is less than it would be if there were no differences between the two strings by an amount that is based on how different the two strings of characters are;

generating a score for the first comment based at least in part on how closely the first string of characters quotes the second string of characters represented by the degree of correlation and based at least in part on a length of the first string of characters;

determining a ranking of a plurality of comments associated with the video, including the first user comment and a plurality of previously posted comments, based at least in part on the score;

causing at least two of the plurality of comments associated with the video to be presented to a second user in association with the video being presented in a second instance of the user interface in an order that is based at least in part on the ranking; and causing a link to a portion of the video that corresponds to the second string of characters to be associated with the first user comment based on the degree of correlation between the first string of characters and the second string of characters, wherein selection of the link causes the portion of the video to be presented in the second instance of the user interface.

2. The method of claim 1, wherein the score is boosted based on the length of the first string of characters.

3. The method of claim 2, wherein determining the ranking further comprises comparing the score for the first user comment with a score for the plurality of previously posted comments.

4. The method of claim 3, wherein causing the comment to be presented to the second user comprises causing a first subset of the plurality of comments associated with the video having the highest scores to be presented in a first portion of a comment section of the second user interface and causing a second subset of the plurality of comments associated with the video that were posted most recently to be presented in a second portion of the comment section.

5. The method of claim 1, wherein the first text data comprises at least one of the following: transcript data of words of dialogue in the video; closed captioning data of words in the video; optical character recognition generated from words in the video.

6. The method of claim 1, further comprising identifying a relevant portion of the second text data based on the determined degree of correlation between the at least a portion of the second text data and a portion of the first text data being greater than a threshold degree of correlation.

7. The method of claim 6, further comprising:
determining a degree of correlation between the relevant portion of the second text data and a relevant portion of third text data of a second user comment of the plurality of comments associated with the video; and
generating an aggregate comment by associating the first user comment and the second user comment upon determining that the degree of correlation between the relevant portions is over a second threshold degree of correlation.

8. The method of claim 7, further comprising generating an aggregate score based on the scores of the first user comment and the second user comment in response to aggregating the first user comment and the second user comment, and wherein causing the first user comment to be presented based on the ranking further comprises causing the first user comment to be presented based on the aggregate score for the aggregated comment.

9. The method of claim 1, wherein comparing the first string of characters to at least the second string of characters from the first text data comprises calculating a distance metric between the two strings that indicates how different the two strings of text are.

10. The method of claim 9, wherein calculating the distance metric comprises calculating a hemming distance between the first string of characters and the second string of characters, wherein the first string of characters and the second string of characters are of equal length.

11. A system for presenting ranked comments based on a correlation between a portion of a video and comments associated with the video, the system comprising:
one or more hardware processors configured to:
receive first text data of words in a video presented to a first user in a first instance of a user interface;
receive second text data that is part of a first user comment posted by the first user in association with the video, wherein the first user comment was posted using the first instance of the user interface;
identify a first string of characters from the second text data that is likely to include a quote of the first text data, wherein the first string of characters includes a plurality of words;
in response to identifying the first string of characters, compare the first string of characters to at least a second string of characters from the first text data;
determine how different the first string of characters is from the second string of characters based on the comparison;
determine a degree of correlation between the first string of characters and the first text data based at least in part on how different the second string of characters is from the first string of characters, wherein the degree of correlation is less than it would be if there were no differences between the two strings by an amount that is based on how different the two strings of characters are;
generate a score for the first comment based at least in part on how closely the first string of characters quotes the second string of characters represented by the degree of correlation and based at least in part on a length of the first string of characters;
determine a ranking of a plurality of comments associated with the video, including the first user comment and a plurality of previously posted comments, based at least in part on the score;
cause at least two of the plurality of comments associated with the video to be presented to a second user in association with the video presented in a second instance of the user interface in an order that is based at least in part on the ranking; and
cause a link to a portion of the video that corresponds to the second string of characters to be associated with the first user comment based on the degree of correlation between the first string of characters and the second string of characters, wherein selection of the link causes the portion of the video to be presented in the second instance of the user interface.

12. The system of claim 11, wherein the score is boosted based on the length of the first string of characters.

13. The system of claim 12, wherein the one or more hardware processors are further configured to compare the score for the first user comment with a score for the plurality of previously posted comments.

14. The system of claim 13, wherein the one or more hardware processors are further configured to cause a first subset of the plurality of comments associated with the video having the highest scores to be presented in a first portion of a comment section of the second user interface and cause a second subset of the plurality of comments associated with the video that were posted most recently to be presented in a second portion of the comment section.

15. The system of claim 11, wherein the first text data comprises at least one of the following: transcript data of words in the video; closed captioning data of words in the video; optical character recognition data generated from words in the video.

16. The system of claim 11, wherein the one or more hardware processors are further configured to identify a relevant portion of the second text data based on the determined degree of correlation between the at least a portion of the second text data and a portion of the first text data being greater than a threshold degree of correlation.

17. The system of claim 16, wherein the one or more hardware processors are further configured to:
    determine a degree of correlation between the relevant portion of the second text data and a relevant portion of third text data of a second user comment of the plurality of comments associated with the video; and
    generate an aggregate comment by associating the first user comment and the second user comment upon determining that the degree of correlation between the relevant portions is over a second threshold degree of correlation.

18. The system of claim 17, wherein the one or more hardware processors are further configured to:
    generate an aggregate score based on the scores of the first user comment and the second user comment in response to aggregating the first user comment and the second user comment; and
    causing the first user comment to be presented based on the aggregate score for the aggregated comment.

19. A non-transitory computer readable medium containing computer executable instructions that, when executed by a processor, cause the processor to perform a method for presenting ranked comments based on a correlation between a portion of a video and comments associated with the video, the method comprising:
    receiving first text data related to a video presented to a first user in a first instance of a user interface;
    receiving second text data that is part of a first user comment posted by a first user in association with the video, wherein the first user comment was posted using the first instance of the user interface;
    identifying a first string of characters from the second text data that is likely to include a quote of the first text data, wherein the first string of characters includes a plurality of words;
    in response to identifying the first string of characters, comparing the first string of characters to at least a second string of characters from the first text data;
    determining how different the first string of characters is from the second string of characters based on the comparison;
    determining a degree of correlation between the first string of characters and the first text data based at least in part on how different the second string of characters is from the first string of characters, wherein the degree of correlation is less than it would be if there were no differences between the two strings by an amount that is based on how different the two strings of characters are;
    generating a score for the first comment based at least in part on how closely the first string of characters quotes the second string of characters represented by the degree of correlation and based at least in part on a length of the first string of characters;
    determining a ranking of a plurality of comments associated with the video, including the first user comment and a plurality of previously posted comments, based at least in part on the score;
    causing at least two of the plurality of comments to be presented to a second user in association with the video presented in a second instance of the user interface in an order that is based at least in part on the ranking; and
    causing a link to a portion of the video that corresponds to the second string of characters to be associated with the first user comment based on the degree of correlation between the first string of characters and the second string of characters, wherein selection of the link causes the portion of the video to be presented in the second instance of the user interface.

20. The non-transitory computer readable medium of claim 19, wherein the score is boosted based on the length of the first string of characters.

21. The non-transitory computer readable medium of claim 20, wherein determining the ranking further comprises comparing the score for the first user comment with a score for the plurality of previously posted comments.

22. The non-transitory computer readable medium of claim 21, wherein causing the comment to be presented to the second user comprises causing a first subset of the plurality of comments associated with the video having the highest scores to be presented in a first portion of a comment section of the second user interface and causing a second subset of the plurality of comments associated with the video that were posted most recently to be presented in a second portion of the comment section.

23. The non-transitory computer readable medium of claim 17, wherein the first text data comprises at least one of the following: transcript data of words in the video; closed captioning data of words in the video; optical character recognition data generated from words in the video.

24. The non-transitory computer readable medium of claim 19, wherein the method further comprises identifying a relevant portion of the second text data based on the determined degree of correlation between the at least a portion of the second text data and a portion of the first text data being greater than a threshold degree of correlation.

25. The non-transitory computer readable medium of claim 24, wherein the method further comprises:
    determining a degree of correlation between the relevant portion of the second data and a relevant portion of third text data of a second user comment; and
    generating an aggregate comment by associating the first user comment and the second user comment upon determining that the degree of correlation between the relevant portions is over a second threshold degree of correlation.

26. The non-transitory computer readable medium of claim 25, wherein the method further comprises generating an aggregate score based on the scores of first user comment and the second user comment in response to aggregating the comment and second comment, and wherein causing the comment to be presented based on the ranking further comprises causing the first comment to be presented based on the aggregate score for the aggregated comment.

* * * * *